(12) United States Patent
Li (10) Patent No.: US 8,982,816 B2
(45) Date of Patent: Mar. 17, 2015

(54) METHOD AND DEVICE FOR COUNTING RESIDENT TIME SPAN RATIO IN DUAL NETWORK OF DUAL MODE SINGLE STANDBY TERMINAL USER

(75) Inventor: Yigang Li, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 451 days.

(21) Appl. No.: 13/577,312

(22) PCT Filed: Apr. 14, 2011

(86) PCT No.: PCT/CN2011/072776
§ 371 (c)(1),
(2), (4) Date: Aug. 6, 2012

(87) PCT Pub. No.: WO2011/143981
PCT Pub. Date: Nov. 24, 2011

(65) Prior Publication Data
US 2012/0307667 A1 Dec. 6, 2012

(30) Foreign Application Priority Data
May 18, 2010 (CN) .......................... 2010 1 0184506

(51) Int. Cl.
| H04W 60/00 | (2009.01) |
| H04W 64/00 | (2009.01) |
| H04W 8/02 | (2009.01) |
| H04W 8/00 | (2009.01) |
| H04W 24/08 | (2009.01) |
| H04W 88/06 | (2009.01) |

(52) U.S. Cl.
CPC .......... *H04W 60/005* (2013.01); *H04W 64/006* (2013.01); *H04W 8/02* (2013.01); *H04W 24/08* (2013.01); *H04W 88/06* (2013.01)
USPC .......................................... 370/329; 370/346

(58) Field of Classification Search
None
See application file for complete search history.

(56) References Cited

U.S. PATENT DOCUMENTS

| 2003/0031150 A1 | 2/2003 | Yukie |
| 2006/0245405 A1 | 11/2006 | Liu et al. |
| 2009/0305707 A1* | 12/2009 | Pudney ......................... 455/445 |
| 2010/0120427 A1* | 5/2010 | Guo ........................... 455/435.1 |
| 2010/0238893 A1* | 9/2010 | Vikberg et al. ............... 370/329 |
| 2010/0279697 A1* | 11/2010 | Yang et al. .................... 455/446 |

FOREIGN PATENT DOCUMENTS

| CN | 101047972 | 10/2007 |
| CN | 101272568 | 9/2008 |
| CN | 101616431 | 12/2009 |

OTHER PUBLICATIONS

International Search Report for PCT/CN2011/072776, English translation attached to original, Both completed by the Chinese Patent Office on Jul. 11, 2011, All together 6 Pages.

* cited by examiner

*Primary Examiner* — Marcus R Smith
(74) *Attorney, Agent, or Firm* — Brooks Kushman P.C.

(57) ABSTRACT

A method and device including modules for performing a statistics on a resident time span ratio of a dual-mode single-standby terminal user in dual networks, including: setting a $T_{start}$, a $T_{end}$ and a period t; with respect to a network of each mode in the dual networks respectively, acquiring a periodic location update times, periodic routing area update times, call time span except periodic location update and periodic routing area update, number of starting-up users, T3212 and T3312 of said user in each period t within a time slice from the $T_{start}$ to the $T_{end}$; according to the parameters, calculating resident time spans of each user in dual domains or CS single-domain network in an idle state, in PS single-domain network in the idle state, and in a connection state, and obtaining the respective resident time spans, thereby the resident time span ratio, of each user in the dual networks.

12 Claims, 2 Drawing Sheets

METHOD AND DEVICE FOR COUNTING RESIDENT TIME SPAN RATIO IN DUAL NETWORK OF DUAL MODE SINGLE STANDBY TERMINAL USER

CROSS-REFERENCE TO RELATED APPLICATION

This application is the U.S. national phase of PCT Appln. No. PCT/CN2011/072776 filed Apr. 14, 2011 which claims priority to Chinese Application No. 201010184506.4 filed May 18, 2010, the disclosures of which are incorporated in their entirety by reference herein.

TECHNICAL FIELD

The present invention relates to a technique for performing a statistics on a resident time span ratio in dual networks in the mobile communication system, and particularly, to a method and device for performing a statistics on the resident time span ratio of a dual mode single standby terminal user in the dual networks.

BACKGROUND OF THE RELATED ART

With the development of the mobile communication technology, mobile communication networks of different modes become more and more. In order to enable users to choose networks of various modes, and more and more network operators provide a dual mode terminal. The dual mode terminal mainly includes two categories of a dual mode dual standby terminal and a dual mode single standby terminal.

The dual mode dual standby terminal is equivalent to combining two terminals of different modes into one terminal, and it can be inserted with two Subscriber Identity Module (SIM) cards or Universal Subscriber Identity Module (USIM) cards simultaneously, and can reside in two networks of different modes simultaneously.

The dual mode single standby terminal only allows one SIM card or USIM to be inserted, and it can reside on two networks of different modes, but can only reside on a network of one mode at a same time. Currently, the provided Time Division-Synchronous Code Division Multiple Access (TD-SCDMA)/Global System for Mobile Communications (GSM) dual mode terminal is precisely the dual mode single standby terminal.

As the dual mode single standby terminal can only reside on the network of one mode at a same time, if a resident time span of the dual mode single standby terminal in one of the two networks is longer, the probability of generating services in the network will also be greater and the generated call charges will also be higher.

Since the 3G network belongs to the 3rd generation mobile communication technology which is more advanced than the 2nd generation mobile communication technology used by the 2G network, therefore, from the perspective of the network operators, it is expected that more dual mode single standby terminal users reside in the 3G network as far as possible and initiate services in the 3G network. When there is no coverage of the 3G network, it should be switched to the 2G network timely, so as to guarantee the continuity for the users of the dual mode single standby terminal using the services and reduce problems of access failure and dropped calls caused by poor coverage. It can be seen that, performing a statistics on a resident time span ratio of the dual mode single standby terminal user in the dual networks has an important significance on controlling the resident time span of the dual mode single standby terminal user in the dual networks. However, the related art can not provide a method for performing a statistics on the resident time span ratio of the dual mode single standby terminal user in the dual networks accurately and effectively.

SUMMARY OF THE INVENTION

In view of this, the main object of the present invention is to provide a method and device for performing a statistics on a resident time span ratio of a dual mode single standby terminal user in dual networks, so as to performing a statistics on the resident time span ratio of the dual mode single standby terminal user in the dual networks.

In order to achieve the foregoing objects, the technical scheme of the present invention is implemented as follows.

The present invention provides a method for performing a statistics on a resident time span ratio of a dual mode single standby terminal user in dual networks, which comprises:

setting a statistics start time ($T_{start}$) and a statistics end time ($T_{end}$), and setting a statistics time period;

with respect to a network of each mode in the dual networks respectively, acquiring following parameters of the dual mode single standby terminal user in each statistics time period within a time slice from the statistics start time to the statistics end time: an occurred periodic location update times, an occurred periodic routing area update times, a call time span except periodic location update and periodic routing area update, the number of resident starting-up users, a periodic location update timer and a periodic routing area update timer;

with respect to the network of each mode in the dual networks respectively, according to the acquired parameters, calculating a resident time span of each dual mode single standby terminal user in dual domains or a Circuit Switched (CS) single domain network in an idle state, the resident time span of each dual mode single standby terminal user in a Packet Switched (PS) single domain network in the idle state, and the resident time span of each dual mode single standby terminal user in a connection state, and obtaining the respective resident time spans of each dual mode single standby terminal user in the dual networks; and according to the respective resident time spans of each dual mode single standby terminal user in the dual networks, obtaining the resident time span ratio of each dual mode single standby terminal user in the dual networks.

Calculating the resident time span of each dual mode single standby terminal user in the dual domains or the CS single domain network in the idle state is specifically:

with respect to the network of each mode in the dual networks respectively, dividing the periodic location update times in each statistics time period by the number of starting-up users in the corresponding statistics time period to obtain the periodic location update times L(t) of each dual mode single standby terminal user occurred in each statistics time period;

adding the L(t) in each statistics time period to obtain the location update times L of each dual mode single standby terminal user within the time slice from the statistics start time to the statistics end time; and multiplying the L by the periodic location update timer to obtain the resident time span of each dual mode single standby terminal user in the dual domains or the CS single domain network in the idle state within the time slice from the statistics start time to the statistics end time.

Calculating the resident time span of each dual mode single standby terminal user in the PS single domain network in the idle state is specifically:

with respect to the network of each mode in the dual networks respectively, dividing the periodic routing area update times in each statistics time period by the number of starting-up users in the corresponding statistics time period to obtain the periodic routing area update times R(t) of each dual mode single standby terminal user occurred in each statistics time period;

adding the R(t) in each statistics time period to obtain the routing area update times R of each dual mode single standby terminal user within the time slice from the statistics start time to the statistics end time; and multiplying the R by the periodic routing area update timer to obtain the resident time span of each dual mode single standby terminal user in the PS single domain network in the idle state within the time slice from the statistics start time to the statistics end time.

Calculating the resident time span of each dual mode single standby terminal user in the connection state is specifically:

with respect to the network of each mode in the dual networks respectively, adding all call time spans except the periodic location update and periodic routing area update in each statistics time period to obtain a total resident time span of all dual mode single standby terminal users in the connection state, dividing the total resident time span by the number of starting-up users in the corresponding statistics time period to obtain a resident time span C(t) of each dual mode single standby terminal user in the connection state in each statistics time period;

adding the C(t) in each statistics time period to obtain the resident time span of each dual mode single standby terminal user in the connection state within the time slice from the $T_{start}$ to $T_{end}$.

The method further comprises: with respect to the network of each mode in the dual networks respectively, adding the resident time span of each dual mode single standby terminal user in the dual domains or the CS single domain network in the idle state, the resident time span of each dual mode single standby terminal user in the PS single domain network in the idle state, and the resident time span of each dual mode single standby terminal user in the connection state to obtain respective resident time spans of each dual mode single standby terminal user in the dual networks.

The method further comprises:

when the resident time span of each dual mode single standby terminal user in one network of the dual networks is obtained, subtracting the statistics start time from the set statistics end time to obtain a statistics time range, and subtracting the obtained resident time span of each dual mode single standby terminal user in one network of the dual networks from the statistics time range to obtain the resident time span of each dual mode single standby terminal user in the other network of the dual networks.

The present invention further provides a device for performing a statistics on a resident time span ratio of a dual mode single standby terminal user in dual networks, which comprises:

a time setting module, configured to: set a statistics start time ($T_{start}$) and a statistics end time ($T_{end}$), and set a statistics time period;

a parameter acquiring module, configured to: with respect to a network of each mode in the dual networks respectively, acquire following parameters of the dual mode single standby terminal user in each statistics time period within a time slice from the statistics start time to the statistics end time: an occurred periodic location update times, an occured periodic routing area update times, a call time span except periodic location update and periodic routing area update, the number of resident starting-up users, a periodic location update timer and a periodic routing area update timer;

a time span calculating module, configured to: with respect to the network of each mode in the dual networks respectively, according to the acquired parameters, calculate a resident time span of each dual mode single standby terminal user in dual domains or a Circuit Switched (CS) single domain network in an idle state, the resident time span of each dual mode single standby terminal user in a Packet Switched (PS) single domain network in the idle state, and the resident time span of each dual mode single standby terminal user in a connection state, and obtain the respective resident time spans of each dual mode single standby terminal user in the dual networks; and a time span ratio calculating module, configured to: according to the respective resident time spans of each dual mode single standby terminal user in the dual networks, obtain the resident time span ratio of each dual mode single standby terminal user in the dual networks.

The time span calculating module is further configured to: with respect to the network of each mode in the dual networks respectively, divide the periodic location update times in each statistics time period by the number of starting-up users in the corresponding statistics time period to obtain the periodic location update times L(t) of each dual mode single standby terminal user occurred in each statistics time period;

add the L(t) in each statistics time period to obtain the location update times L of each dual mode single standby terminal user within the time slice from the statistics start time to the statistics end time; and multiply the L by the periodic location update timer to obtain the resident time span of each dual mode single standby terminal user in the dual domains or the CS single domain network in the idle state within the time slice from the statistics start time to the statistics end time.

The time span calculating module is further configured to: with respect to the network of each mode in the dual networks respectively, divide the periodic routing area update times in each statistics time period by the number of starting-up users in the corresponding statistics time period to obtain the periodic routing area update times R(t) of each dual mode single standby terminal user occurred in each statistics time period;

add the R(t) in each statistics time period to obtain the routing area update times R of each dual mode single standby terminal user within the time slice from the statistics start time to the statistics end time; and multiply the R by the periodic routing area update timer to obtain the resident time span of each dual mode single standby terminal user in the PS single domain network in the idle state within the time slice from the statistics start time to the statistics end time.

The time span calculating module is further configured to: with respect to the network of each mode in the dual networks respectively, add all call time spans except the periodic location update and periodic routing area update in each statistics time period to obtain a total resident time span of all dual mode single standby terminal users in the connection state, divide the total resident time span by the number of starting-up users in the corresponding statistics time period to obtain a resident time span C(t) of each dual mode single standby terminal user in the connection state in each statistics time period;

add the C(t) in each statistics time period to obtain the resident time span of each dual mode single standby terminal user in the connection state within the time slice from the $T_{start}$ to $T_{end}$.

The time span calculating module is further configured to: with respect to the network of each mode in the dual networks respectively, add the resident time span of each dual mode single standby terminal user in the dual domains or the CS single domain network in the idle state, the resident time span of each dual mode single standby terminal user in the PS single domain network in the idle state, and the resident time span of each dual mode single standby terminal user in the connection state to obtain the respective resident time spans of each dual mode single standby terminal user in the dual networks.

The time span calculating module is further configured to: when the resident time span of each dual mode single standby terminal user in one network of the dual networks is obtained, subtract the statistics start time from the set statistics end time to obtain a statistics time range, and subtract the obtained resident time span of each dual mode single standby terminal user in one network of the dual networks from the statistics time range to obtain the resident time span of each dual mode single standby terminal user in the other network of the dual networks.

With the method and device for performing a statistics on the resident time span ratio of the dual mode single standby terminal user in the dual networks provided by the present invention, the statistics for the resident time spans and resident time span ratio of the dual mode single standby terminal user in the dual networks can be implemented easily, the statistical information will be more accurate and effective, and it is not required to modify the current CN and UMTS Terrestrial Radio Access Network (UTRAN) in the present invention, thereby saving the investment cost of the operators greatly.

PREFERRED EMBODIMENTS OF THE PRESENT INVENTION

The technical scheme of the present invention will be further described in detail in combination with the accompanying drawings and specific examples below.

In practical applications, in the process of a UE residing in the network, if it is the case of dual-domain residing in an idle state, that is, attaching to a Circuit Switched (CS) domain and a Packet Switched (PS) domain simultaneously, or the case of CS single domain residing, then, when the time set by a periodic location update timer (T3212) is reached, the UE needs to perform a periodic location update, its main function is to inform a Core Network (CN) of that the UE is still attached to the network.

In the process of the UE residing in the network, if it is the case of PS single domain residing, then, when the time set by a periodic routing area update timer (T3312) is reached in the idle state, the UE needs to a periodic routing area update, its main function is to inform a the CN in the PS domain of that the UE is still attached to the network.

When the UE is in an off-network state for a long time, after the time set by the T3212 or T3312 is reached, and if the periodic location update or periodic routing area update is not performed timely, the CN will set the UE to be in an implied shutdown state after an implied shutdown timer set by the CN itself is expired. After the CN set the UE to be in the implied shutdown, the user can continue to obtain network services only when the user initiates an attach request again. After any types of calls are performed, including the location update and routing area update, the periodic location update timer or periodic routing area update timer inside the UE will be set as 0.

The present invention exactly uses the principle that, once the user resides in the network in the mobile communication system, a periodic location update is inevitably performed once every T3212 time period in the idle state; a periodic routing area update is inevitably performed once every T3312 time period in the idle state; and the periodic location update timer/periodic routing area update timer are set as 0 after one call is completed, to performing a statistics on for the resident time span ratio of the dual mode single standby terminal user in the dual networks. An implementation premise for the statistics method is that two networks of different modes do not share a Location Area Code (LAC), that is, LACs of the two networks of different modes are different.

Figure 1:
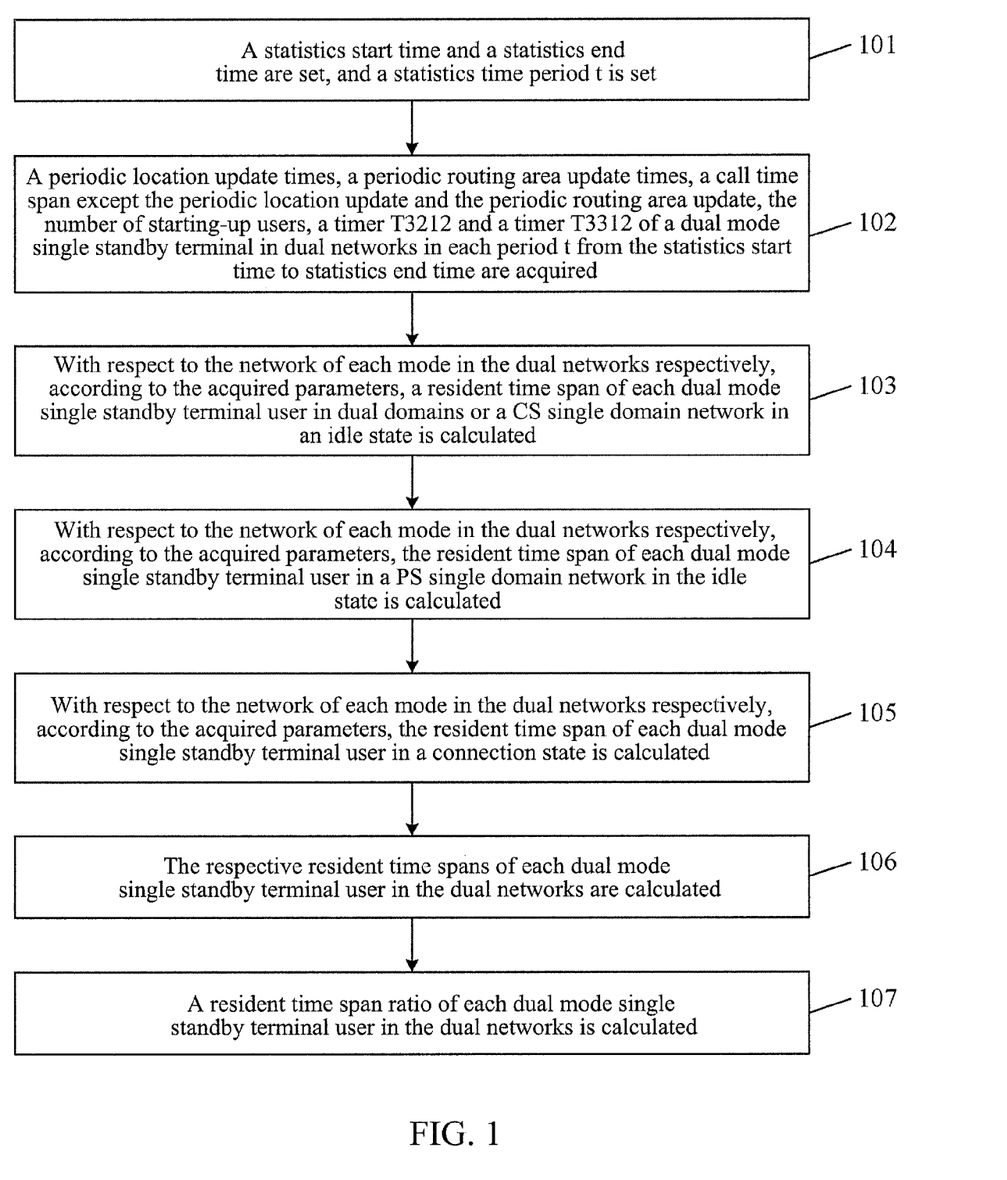
FIG. 1 is a flow diagram of the method for performing a statistics on a resident time span ratio of a dual mode single standby terminal user in dual networks according to the present invention.

The present invention provides a method for performing a statistics on a resident time span ratio of a dual mode single standby terminal user in dual networks, and as shown in FIG. 1, following steps are mainly included.

In step 101, a statistics start time ($T_{start}$) and a statistics end time ($T_{end}$) are set, and a statistics time period t is set.

The set statistics start time ($T_{start}$) and statistics end time ($T_{end}$) must satisfy that: most of dual mode single standby terminals are in a power-on state in this time slice, and will not have an automatic shutdown; and the set statistics time period t must satisfy that: the statistics time period t is less than or equal to a difference between the foregoing statistics end time ($T_{end}$) and statistics start time ($T_{start}$), namely, $t \leq T_{end} - T_{start}$.

In step 102, with respect to the network of each mode in the dual networks respectively, following parameters of the dual mode single standby terminal user in each period t of the time slice from the $T_{start}$ to $T_{end}$ are acquired: an occurred periodic location update times, an occurred periodic routing area update times, a call time span except the periodic location update and the periodic routing area update, the number of resident starting-up users, a periodic location update timer T3212 and a periodic routing area update timer T3312.

Wherein, a statistics principle of the periodic location update times and periodic routing area update times is: if only the periodic location update occurs in one call, or the periodic location update and periodic routing area update occur in one call simultaneously, only bringing the periodic location update into a statistics sample, but not bringing the periodic routing area update into the statistics sample; and if only the periodic routing area update occurs in one call, bringing the periodic routing area update into the statistics sample.

When the above data are collected, the data of the two networks of different modes are required to be collected at the same time, and the collection mode includes but is not limited to: drive test, call quality test, single-user or multiple-user signaling trace, core network counter statistics, radio access network counter statistics, and local network or whole network signaling collection and so on. It is assumed that the two networks of different modes are called as TD-SCDMA network and GSM network respectively, thus the operation of step 102 includes two aspects: one aspect is to acquire the periodic location update times, the periodic routing area update times, the call time span except periodic location update and periodic routing area update, the number of resident starting-up users, the periodic location update timer T3212 and the periodic routing area update timer T3312 in the TD-SCDMA network; the other aspect is to acquire the periodic location update times, the periodic routing area update times, the call time span except periodic location update and periodic routing area update, the number of resident starting-up users, the periodic location update timer T3212 and the periodic routing area update timer T3312 in the GSM network. Therefore, in the subsequent operation steps, unless otherwise noted, it defaults to operations executed on the networks of different modes in the dual networks respectively. In addition, the T3212 and T3312 can be acquired from the network side directly.

In step 103, with respect to the network of each mode in the dual networks respectively, according to the acquired parameters, a resident time span of each dual mode single standby terminal user in dual domains or a CS single domain network in an idle state is calculated.

Specifically, with respect to the network of each mode in the dual networks respectively, the periodic location update times in each statistics time period t is divided by the number of starting-up users in the corresponding statistics time period t to obtain the periodic location update times L(t) of each dual mode single standby terminal user occurred in each statistics time period t;

the L(t) in each statistics time period t is added to obtain the location update times L of each dual mode single standby terminal user within the time slice from the $T_{start}$ to $T_{end}$; and the L is multiplied by the periodic location update timer T3212 to obtain the resident time span of each dual mode single standby terminal user in the dual domains or the CS single domain network in the idle state within the time slice from the $T_{start}$ to $T_{end}$.

In step 104, with respect to the network of each mode in the dual networks respectively, according to the acquired parameters, the resident time span of each dual mode single standby terminal user in a PS single domain network in the idle state is calculated.

Specifically, with respect to the network of each mode in the dual networks respectively, the periodic routing area update times in each statistics time period t is divided by the number of starting-up users in the corresponding statistics time period t to obtain the periodic routing area update times R(t) of each dual mode single standby terminal user occurred in each statistics time period t;

the R(t) in each statistics time period is added to obtain the routing area update times R of each dual mode single standby terminal user within the time slice from the $T_{start}$ to $T_{end}$; and the R is multiplied by the periodic routing area update timer T3312 to obtain the resident time span of each dual mode single standby terminal user in PS single domain network in the idle state within the time slice from the $T_{start}$ to $T_{end}$.

In step 105, with respect to the network of each mode in the dual networks respectively, according to the acquired parameters, the resident time span of each dual mode single standby terminal user in a connection state is calculated.

Specifically, with respect to the network of each mode in the dual networks respectively, the call time spans except the periodic location update and periodic routing area update of all users in each statistics time period t are added to obtain a total resident time span of all dual mode single standby terminal users in the connection state in each statistics time period t, the total resident time span is divided by the number of starting-up users in the corresponding statistics time period t to obtain a resident time span C(t) of each dual mode single standby terminal user in the connection state in each statistics time period t;

the C(t) in each statistics time period is added to obtain a resident time span C of each dual mode single standby terminal user in the connection state within the time slice from the $T_{start}$ to $T_{end}$.

In step 106, the respective resident time spans of each dual mode single standby terminal user in the dual networks are calculated.

Specifically, the resident time span of each dual mode single standby terminal user in the dual domains or the CS single domain network in the idle state, the resident time span of each dual mode single standby terminal user in the PS single domain network in the idle state, and the resident time span of each dual mode single standby terminal user in the connection state are added to obtain the respective resident time spans of each dual mode single standby terminal user in the dual networks.

In step 107, the resident time span ratio of each dual mode single standby terminal user in the dual networks is calculated.

The respective resident time spans of each dual mode single standby terminal user in the dual networks are compared, thereby obtaining the resident time span ratio of each dual mode single standby terminal user in the dual networks.

In addition, as one preferred example of the present invention, when only the resident time span of each dual mode single standby terminal user in one network of the dual networks is obtained, the statistics start time can be subtracted from the set statistics end time to obtain a statistics time range, and the foregoing obtained resident time span of each dual mode single standby terminal user in one network of the dual networks can be subtracted from the statistics time range, thereby obtaining the resident time span of each dual mode single standby terminal user in the other network of the dual networks.

It should be noted that, the method for performing a statistics on the resident time span ratio of the dual mode single standby terminal user in the dual networks of the present invention is applicable to all mobile communication networks which have the periodic location update or periodic routing area update mechanism.

A TD-SCDMA/GSM dual mode single standby terminal is taken as an example to further describe the above method for performing a statistics on the resident time span ratio of the dual mode single standby terminal user in the dual networks in detail below. The method for performing a statistics on the resident time span ratio of the TD-SCDMA/GSM dual mode single standby terminal in the dual networks mainly includes following steps, wherein, data of the TD-SCDMA network and GSM network are required to be collected simultaneously.

In step 201, the statistics start time $T_{start}$ and the statistics end time $T_{end}$ are set, and the statistics time period t is set.

In step 202, it is to perform the statistics on the periodic location update times occurred in each period t, the periodic routing area update times occurred in a PS single domain, the call time span except the periodic location update and periodic routing area update, the number of resident starting-up users, T3212 and T3312 of the dual mode terminal between the $T_{start}$ and $T_{end}$ in the TD-SCDMA network.

In step 203, it is to perform the statistics on the periodic location update times occurred in each period t, the periodic routing area update times occurred in the PS single domain, the call time span except the periodic location update and periodic routing area update, the number of resident starting-up users, T3212 and T3312 of the dual mode terminal between the $T_{start}$ and $T_{end}$ in the GSM network.

In step 204, the periodic location update times in each period t in the TD-SCDMA network is divided by the number of starting-up users in the period t to obtain a periodic location update times $L_{td}$ (t) of each user in the TD-SCDMA network occurred in each period t.

In step 205, the $L_{td}$(t) in each period t is added to obtain the location update times $L_{td}$ of each user in the TD-SCDMA network within the statistics time range from the $T_{start}$ to $T_{end}$.

In step 206, the $L_{td}$ is multiplied by the timer T3212 of the TD-SCDMA network to obtain a resident time span $T_{tdcsps}$ of each user in the idle state in a CS single domain or dual domains in the TD-SCDMA network within the statistics time range from the $T_{start}$ to $T_{end}$.

In step 207, the periodic routing area update times in the PS single domain in each period t in the TD-SCDMA network is divided by the number of starting-up users in the period t to obtain periodic routing area update times $R_{td}$ (t) of each user in the PS single domain in the TD-SCDMA network occurred in each period t.

In step 208, the $R_{td}$ (t) in each period t is added to obtain a periodic routing area update times $R_{td}$ of each user in the TD-SCDMA network within the statistics time range from the $T_{start}$ to $T_{end}$.

In step 209, the $R_{td}$ is multiplied by the timer T3312 of the TD-SCDMA network to obtain a resident time span $T_{tdps}$ of each user in the idle state in the PS single domain in the TD-SCDMA network within the statistics time range from the $T_{start}$ to $T_{end}$.

In step 210, all call time spans except the periodic location update and periodic routing area update in each period t in the TD-SCDMA network are added to obtain a total call time span except the periodic location update and periodic routing area update of all dual mode single standby terminal users in each period t, and the total call time span is divided by the number of starting-up users in the period t to obtain a resident time span $T_{tdconnect}$ (t) of each dual mode single standby terminal user in the connection state in the TD-SCDMA network in each period t.

In step 211, the $T_{tdconnect}$ (t) in each period t is added to obtain a resident time span $T_{tdconnect}$ of each dual mode single standby terminal user in the connection state in the TD-SCDMA network within the statistics time range from the $T_{start}$ to $T_{end}$.

In step 212, the $T_{tdcsps}$, $T_{tdps}$ and $T_{tdconnect}$ are added to obtain a resident time span $T_{td}$ of each user in the TD-SCDMA network within the time from the $T_{start}$ to $T_{end}$.

In step 213, the periodic location update times in each period t in the GSM network is divided by the number of starting-up users in the period t to obtain a periodic location update times $L_{gsm}$ (t) of each user in the GSM network occurred in each period t.

In step 214, the $L_{gsm}$ (t) in each period t is added to obtain location update times $L_{gsm}$ of each user in the GSM network within the statistics time range from the $T_{start}$ to $T_{end}$.

In step 215, the $L_{gsm}$ is multiplied by the timer T3212 of the GSM network to obtain a resident time span $T_{gsmcsps}$ of each user in the idle state in the CS single domain or dual domains in the GSM network within the statistics time range from the $T_{start}$ to $T_{end}$.

In step 216, the periodic routing area update times in the PS single domain in each period t in the GSM network is divided by the the number of starting-up users in the period t to obtain a periodic routing area update times $R_{gsm}$ (t) of each user in the PS single domain in the GSM network occurred in each period t.

In step 217, the $R_{gsm}$ (t) in each period t is added to obtain a periodic routing area update times $R_{gsm}$ of each user in the GSM network within the statistics time range from the $T_{start}$ to $T_{end}$.

In step 218, the $R_{gsm}$, is multiplied by the timer T3312 of the GSM network to obtain a resident time span $T_{gsmps}$ of each user in the idle state in the PS single domain in the TD-GSM network within the statistics time range from the $T_{start}$ to $T_{end}$.

In step 219, all call time spans except the periodic location update and periodic routing area update in each period t in the GSM network are added to obtain a total call time span except the periodic location update and periodic routing area update of all dual mode single standby terminal users in each period t, and the total call time span is divided by the number of starting-up users in the period t to obtain a resident time span $T_{gsmconnect}$ (t) of each dual mode single standby terminal user in the connection state in the GSM network in each period t.

In step 220, the $T_{gsmconnect}$ (t) in each period t is added to obtain a resident time span $T_{gsmconnect}$ of each dual mode single standby terminal user in the connection state in the GSM network within the statistics time range from the $T_{start}$ to $T_{end}$.

In step 221, the $T_{gsmcsps}$, $T_{gsmps}$ and $T_{gsmconnect}$ are added to obtain a resident time span $T_{gsm}$ of each user in the GSM network within the statistics time range from the $T_{start}$ to $T_{end}$.

In step 222, the $T_{td}$ is divided by the $T_{gsm}$ to obtain a resident time span ratio $CTR_{tdgsm}$ of the dual mode single standby terminal in the TD-SCDMA network and GSM network.

It should be noted that, in each operation step of the above examples, the related processing operations with respect to the TD-SCDMA network and GSM network are not in a particular order, and also can be executed simultaneously. It should be understand that the step numbers in the above examples do not limit a chronological order among the operation steps of the TD-SCDMA network and GSM network.

In addition, as another preferred example, in the condition that only the resident time span $T_{td}$ of each user in the TD-SCDMA network within the time from the $T_{start}$ to $T_{end}$ can be obtained, the resident time span $T_{gsm}$ of each user in the GSM network within the time from the $T_{start}$ to $T_{end}$ can be directly obtained according to the following formula, namely, $T_{gsm}=T_{end}-T_{start}-T_{td}$. On the contrary, in the condition that only the resident time span $T_{gsm}$ of each user in the GSM network within the time from the $T_{start}$ to $T_{end}$ can be obtained, the resident time span $T_{td}$ of each user in the TD-SCDMA network network within the time from the $T_{start}$ to $T_{end}$ also can be directly obtained according to the following formula, namely, $T_{td}=T_{end}-T_{start}-T_{gsm}$.

Figure 2:
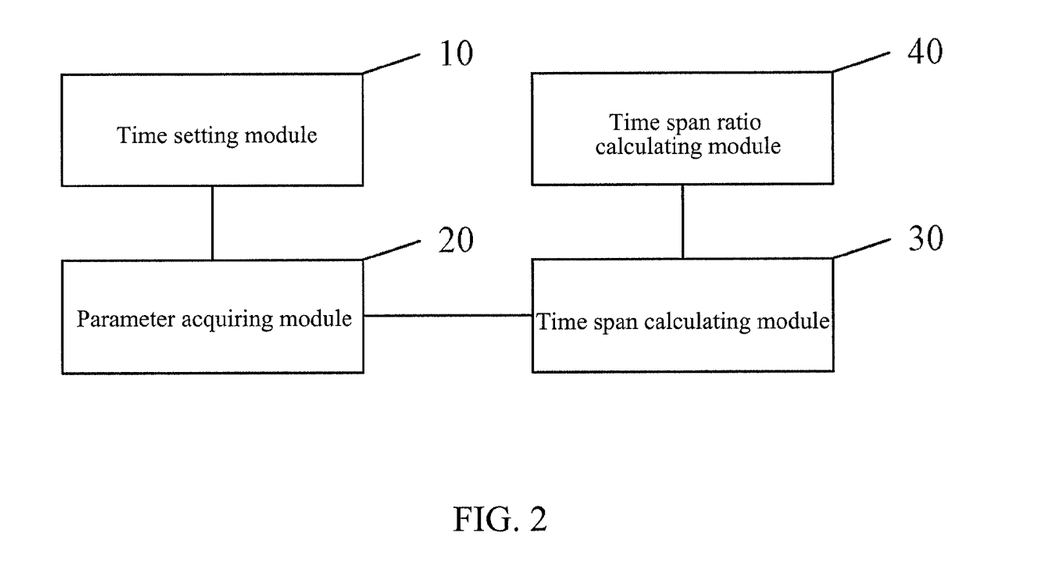
FIG. 2 is a structure diagram of the device for performing a statistics on a resident time span ratio of a dual mode single standby terminal user in dual networks according to the present invention.

Corresponding to the above method for performing a statistics on the resident time span ratio of the dual mode single standby terminal user in the dual networks, the present invention also provides a device for performing a statistics on the resident time span ratio of the dual mode single standby terminal user in the dual networks, and as shown in FIG. 2, the device comprises: a time setting module 10, a parameter acquiring module 20, a time span calculating module 30 and a time span ratio calculating module 40. Wherein, the time setting module 10 is configured to: set a statistics start time and a statistics end time, and set a statistics time period. The parameter acquiring module 20 is configured to: with respect to a network of each mode in the dual networks respectively, acquire following parameters of the dual mode single standby terminal user in each statistics time period within a time slice from the statistics start time to statistics end time: an occurred periodic location update times, an occurred periodic routing area update times, a call time span except periodic location update and periodic routing area update, the number of resident starting-up users, a periodic location update timer and a periodic routing area update timer. The time span calculating module 30 is configured to: with respect to the network of each mode in the dual networks respectively, according to the acquired parameters, calculate a resident time span of each dual mode single standby terminal user in dual domains or a Circuit Switched (CS) single domain network in an idle state, a resident time span of each dual mode single standby terminal user in a Packet Switched (PS) single domain network in the idle state, and a resident time span of each dual mode single standby terminal user in a connection state, and obtain the respective resident time spans of each dual mode single standby terminal user in the dual networks. The time span ratio calculating module 40 is configured to: according to the respective resident time spans of each dual mode single standby terminal user in the dual networks, obtain the resident time span ratio of each dual mode single standby terminal user in the dual networks.

Preferably, the time span calculating module 30 is further configured to: with respect to the network of each mode in the dual networks respectively, divide the periodic location update times in each statistics time period by the number of starting-up users in the corresponding statistics time period to obtain a periodic location update times L(t) of each dual mode single standby terminal user occurred in each statistics time period; add the L(t) in each statistics time period to obtain a location update times L of each dual mode single standby terminal user within the time slice from the statistics start time to statistics end time; and multiply the L by the periodic location update timer to obtain the resident time span of each dual mode single standby terminal user in the dual domains or the CS single domain network in the idle state within the time slice from the statistics start time to statistics end time.

Preferably, the time span calculating module 30 is further configured to: with respect to the network of each mode in the dual networks respectively, divide the periodic routing area update times in each statistics time period by the number of starting-up users in the corresponding statistics time period to obtain a periodic routing area update times R(t) of each dual mode single standby terminal user occurred in each statistics time period; add the R(t) in each statistics time period to obtain a routing area update times R of each dual mode single standby terminal user within the time slice from the statistics start time to statistics end time; and multiply the R by the periodic routing area update timer to obtain the resident time span of each dual mode single standby terminal user in the PS single domain network in the idle state within the time slice from the statistics start time to statistics end time.

Preferably, the time span calculating module 30 is further configured to: with respect to the network of each mode in the dual networks respectively, add all call time spans except the periodic location update and periodic routing area update in each statistics time period to obtain a total resident time span of all dual mode single standby terminal users in the connection state; divide the total resident time span by the number of starting-up users in the corresponding statistics time period to obtain a resident time span C(t) of each dual mode single standby terminal user in the connection state in each statistics time period; add the C(t) in each statistics time period to obtain the resident time span of each dual mode single standby terminal user in the connection state within the time slice from the statistics start time to statistics end time.

Preferably, the time span calculating module 30 is further configured to: with respect to the network of each mode in the dual networks respectively, add the resident time span of each dual mode single standby terminal user in the dual domains or the CS single domain network in the idle state, the resident time span of each dual mode single standby terminal user in the PS single domain network in the idle state, and the resident time span of each dual mode single standby terminal user in the connection state to obtain the respective resident time spans of each dual mode single standby terminal user in the dual networks.

Preferably, the time span calculating module 30 is further configured to: when the resident time span of each dual mode single standby terminal user in one network of the dual networks is obtained, subtract the statistics start time from the set statistics end time to obtain a statistics time range, and subtract the obtained resident time span of each dual mode single standby terminal user in one network of the dual networks from the statistics time range to obtain the resident time span of each dual mode single standby terminal user in the other network of the dual networks.

The above description is only the preferred examples of the present invention, which is not used to limit the protection scope of the present invention.

What is claimed is:

1. A method for performing a statistics on a resident time span ratio of a dual mode single standby terminal user in dual networks, comprising:

setting a statistics start time ($T_{start}$) and a statistics end time ($T_{end}$), and setting a statistics time period;

with respect to the network of each mode in the dual networks respectively, acquiring following parameters of the dual mode single standby terminal user in each statistics time period within a time slice from the statistics start time to the statistics end time: an occurred periodic location update times, an occurred periodic routing area update times, a call time span except the periodic location update and the periodic routing area update, a number of resident starting-up users, a periodic location update timer and a periodic routing area update timer;

with respect to the network of each mode in the dual networks respectively, according to the acquired parameters, calculating a resident time span of each dual mode single standby terminal user in dual domains or a Circuit Switched (CS) single domain network in an idle state, a resident time span of each dual mode single standby terminal user in a Packet Switched (PS) single domain network in the idle state, and a resident time span of each dual mode single standby terminal user in a connection state, and obtaining respective resident time spans of each dual mode single standby terminal user in the dual networks; and according to the respective resident time spans of each dual mode single standby terminal user in the dual networks, obtaining the resident time span ratio of each dual mode single standby terminal user in the dual networks.

2. The method for performing a statistics on the resident time span ratio of the dual mode single standby terminal user in the dual networks according to claim 1, wherein, calculating the resident time span of each dual mode single standby terminal user in the dual domains or the CS single domain network in the idle state is specifically:

with respect to the network of each mode in the dual networks respectively, dividing the periodic location update times in each statistics time period by the number of starting-up users in the corresponding statistics time period to obtaining a periodic location update times L(t)

of each dual mode single standby terminal user occurred in each statistics time period;

adding the L(t) in each statistics time period to obtaining a location update times L of each dual mode single standby terminal user within the time slice from the statistics start time to statistics end time; and multiplying the L by the periodic location update timer to obtain the resident time span of each dual mode single standby terminal user in the dual domains or the CS single domain network in the idle state within the time slice from the statistics start time to statistics end time.

3. The method for performing a statistics on the resident time span ratio of the dual mode single standby terminal user in the dual networks according to claim 1, wherein, calculating the resident time span of each dual mode single standby terminal user in the PS single domain network in the idle state is specifically:

with respect to the network of each mode in the dual networks respectively, dividing the periodic routing area update times in each statistics time period by the number of starting-up users in the corresponding statistics time period to obtain a periodic routing area update times R(t) of each dual mode single standby terminal user occurred in each statistics time period;

adding the R(t) in each statistics time period to obtaining a routing area update times R of each dual mode single standby terminal user within the time slice from the statistics start time to statistics end time; and multiplying the R by the periodic routing area update timer to obtain the resident time span of each dual mode single standby terminal user in the PS single domain network in the idle state within the time slice from the statistics start time to statistics end time.

4. The method for performing a statistics on the resident time span ratio of the dual mode single standby terminal user in the dual networks according to claim 1, wherein, calculating the resident time span of each dual mode single standby terminal user in the connection state is specifically:

with respect to the network of each mode in the dual networks respectively, adding all call time spans except the periodic location update and periodic routing area update in each statistics time period to obtain a total resident time span of all dual mode single standby terminal users in the connection state, dividing the total resident time span by the number of starting-up users in the corresponding statistics time period to obtain a resident time span C(t) of each dual mode single standby terminal user in the connection state in each statistics time period;

adding the C(t) in each statistics time period to obtain the resident time span of each dual mode single standby terminal user in the connection state within the time slice from the $T_{start}$ to $T_{end}$.

5. The method for performing a statistics on the resident time span ratio of the dual mode single standby terminal user in the dual networks according to claim 1 wherein, the method further comprises: with respect to the network of each mode in the dual networks respectively, adding the resident time span of each dual mode single standby terminal user in the dual domains or the CS single domain network in the idle state, the resident time span of each dual mode single standby terminal user in the PS single domain network in the idle state, and the resident time span of each dual mode single standby terminal user in the connection state to obtain the respective resident time spans of each dual mode single standby terminal user in the dual networks.

6. The method for performing a statistics on the resident time span ratio of the dual mode single standby terminal user in the dual networks according to claim 1, wherein, the method further comprises:

when the resident time span of each dual mode single standby terminal user in one network of the dual networks is obtained, subtracting the statistics start time from the set statistics end time to obtain a statistics time range, and subtracting the obtained resident time span of each dual mode single standby terminal user in one network of the dual networks from the statistics time range to obtain the resident time span of each dual mode single standby terminal user in the other network of the dual networks.

7. A device for performing a statistics on a resident time span ratio of a dual mode single standby terminal user in dual networks, comprising:

a time setting module, configured to: set a statistics start time ($T_{start}$) and a statistics end time ($T_{end}$), and set a statistics time period;

a parameter acquiring module, configured to: with respect to a network of each mode in the dual networks respectively, acquire following parameters of the dual mode single standby terminal user in each statistics time period within a time slice from the statistics start time to statistics end time: an occurred periodic location update times, an occurred periodic routing area update times, a call time span except periodic location update and periodic routing area update, a number of resident starting-up users, a periodic location update timer and a periodic routing area update timer;

a time span calculating module, configured to: with respect to the network of each mode in the dual networks respectively, according to the acquired parameters, calculate a resident time span of each dual mode single standby terminal user in dual domains or a Circuit Switched (CS) single domain network in an idle state, the resident time span of each dual mode single standby terminal user in a Packet Switched (PS) single domain network in the idle state, and the resident time span of each dual mode single standby terminal user in a connection state, and obtain the respective resident time spans of each dual mode single standby terminal user in the dual networks; and a time span ratio calculating module, configured to: according to the respective resident time spans of each dual mode single standby terminal user in the dual networks, obtain the resident time span ratio of each dual mode single standby terminal user in the dual networks.

8. The device for performing a statistics on the resident time span ratio of the dual mode single standby terminal user in the dual networks according to claim 7, wherein, the time span calculating module is further configured to: with respect to the network of each mode in the dual networks respectively, divide the periodic location update times in each statistics time period by the number of starting-up users in the corresponding statistics time period to obtain a periodic location update times L(t) of each dual mode single standby terminal user occurred in each statistics time period;

add the L(t) in each statistics time period to obtain a location update times L of each dual mode single standby terminal user within the time slice from the statistics start time to statistics end time; and multiply the L by the periodic location update timer to obtain the resident time span of each dual mode single standby terminal user in the dual domains or the CS single domain network in the idle state within the time slice from the statistics start time to statistics end time.

9. The device for performing a statistics on the resident time span ratio of the dual mode single standby terminal user in the dual networks according to claim 7, wherein, the time span calculating module is further configured to: with respect to the network of each mode in the dual networks respectively, divide the periodic routing area update times in each statistics time period by the number of starting-up users in the corresponding statistics time period to obtain a periodic routing area update times R(t) of each dual mode single standby terminal user occurred in each statistics time period;
    add the R(t) in each statistics time period to obtain a routing area update times R of each dual mode single standby terminal user within the time slice from the statistics start time to statistics end time; and
    multiply the R by the periodic routing area update timer to obtain the resident time span of each dual mode single standby terminal user in the PS single domain network in the idle state within the time slice from the statistics start time to statistics end time.

10. The device for performing a statistics on the resident time span ratio of the dual mode single standby terminal user in the dual networks according to claim 7, wherein, the time span calculating module is further configured to: with respect to the network of each mode in the dual networks respectively, add all call time spans except the periodic location update and the periodic routing area update in each statistics time period to obtain a total resident time span of all dual mode single standby terminal users in the connection state, divide the total resident time span by the number of starting-up users in the corresponding statistics time period to obtain a resident time span C(t) of each dual mode single standby terminal user in the connection state in each statistics time period;
    add the C(t) in each statistics time period to obtain the resident time span of each dual mode single standby terminal user in the connection state within the time slice from the $T_{start}$ to $T_{end}$.

11. The device for performing a statistics on the resident time span ratio of the dual mode single standby terminal user in the dual networks according to claim 7, wherein, the time span calculating module is further configured to: with respect to the network of each mode in the dual networks respectively, add the resident time span of each dual mode single standby terminal user in the dual domain or the CS single domain network in the idle state, the resident time span of each dual mode single standby terminal user in the PS single domain network in the idle state, and the resident time span of each dual mode single standby terminal user in the connection state to obtain the respective resident time spans of each dual mode single standby terminal user in the dual networks.

12. The device for performing a statistics on the resident time span ratio of the dual mode single standby terminal user in the dual networks according to claim 7, wherein, the time span calculating module is further configured to: when the resident time span of each dual mode single standby terminal user in one network of the dual networks is obtained, subtract the statistics start time from the set statistics end time to obtain a statistics time range, and subtract the obtained resident time span of each dual mode single standby terminal user in one network of the dual networks from the statistics time range to obtain the resident time span of each dual mode single standby terminal user in the other network of the dual networks.

\* \* \* \* \*